United States Patent
Bloomer

(10) Patent No.: US 7,972,531 B2
(45) Date of Patent: Jul. 5, 2011

(54) ANTI-FREEZING/DEICING AGENT AND RELATED METHODS

(75) Inventor: Todd A. Bloomer, Lexington, KY (US)

(73) Assignee: Natural Alternatives, LLC, Lexington, KY (US)

( * ) Notice: Subject to any disclaimer, the term of this patent is extended or adjusted under 35 U.S.C. 154(b) by 0 days.

(21) Appl. No.: 12/546,251

(22) Filed: Aug. 24, 2009

(65) Prior Publication Data

US 2010/0044623 A1 Feb. 25, 2010

Related U.S. Application Data

(60) Provisional application No. 61/091,593, filed on Aug. 25, 2008.

(51) Int. Cl.
*C09K 3/18* (2006.01)

(52) U.S. Cl. .......................... 252/70; 106/13

(58) Field of Classification Search .......... 106/13; 252/70
See application file for complete search history.

(56) References Cited

U.S. PATENT DOCUMENTS

| | | | |
|---|---|---|---|
| 3,555,727 A | 1/1971 | Jaquith | |
| 4,594,076 A | 6/1986 | Blake | |
| 4,676,918 A | 6/1987 | Toth et al. | |
| 4,689,201 A | 8/1987 | Longworth | |
| 4,824,588 A | 4/1989 | Lin | |
| 4,937,082 A * | 6/1990 | Sawhill | 426/69 |
| 5,071,579 A | 12/1991 | Johnston | |
| 5,635,101 A | 6/1997 | Janke et al. | |
| 5,639,319 A | 6/1997 | Daly | |
| 5,709,812 A | 1/1998 | Janke et al. | |
| 5,709,813 A | 1/1998 | Janke et al. | |
| 5,709,894 A * | 1/1998 | Julien | 426/53 |
| 6,059,989 A | 5/2000 | Stankowiak | |
| 6,299,793 B1 | 10/2001 | Hartley et al. | |
| 6,398,979 B2 | 6/2002 | Koefod et al. | |
| 6,436,310 B1 | 8/2002 | Hartley et al. | |
| 6,440,325 B1 | 8/2002 | Hartley et al. | |
| 6,582,622 B1 | 6/2003 | Hartley et al. | |
| 6,596,188 B1 | 7/2003 | Hartley et al. | |
| 6,599,440 B2 | 7/2003 | Hartley et al. | |
| 6,616,739 B1 | 9/2003 | Spanos | |
| 6,770,217 B2 | 8/2004 | Hartley et al. | |
| 6,800,217 B2 | 10/2004 | Koefod et al. | |
| 6,805,811 B2 | 10/2004 | Hartley et al. | |
| 6,827,873 B2 | 12/2004 | Hartley et al. | |
| 6,890,451 B2 | 5/2005 | Sapienza et al. | |
| 6,905,631 B2 | 6/2005 | Hartley et al. | |
| 7,014,789 B2 | 3/2006 | Hartley et al. | |
| 2005/0179000 A1 | 8/2005 | Sapienza et al. | |
| 2005/0247907 A1 | 11/2005 | Sapienza et al. | |
| 2005/0277712 A1 | 12/2005 | Daly | |

FOREIGN PATENT DOCUMENTS

| | | |
|---|---|---|
| EP | 1 221 472 A2 | 10/2002 |
| GB | 955642 A * | 4/1964 |
| JP | 61-53382 A | 3/1986 |
| WO | WO 01/07532 A1 | 2/2001 |
| WO | WO 02/26910 A1 | 4/2002 |
| WO | WO02/005542 A1 * | 7/2002 |

OTHER PUBLICATIONS

Derwent Acc-No. 2003-055347, abstract of Korea Patent Specification No. KR2002056373 A (Jul. 2002).*
Derwent Acc-No. 2003-088131, abstract of Korea Patent Specification No. KR2002060552 A (Jul. 2002).*
Chemical Abstract No. 105:80842, abstract of Japanese Patent Specification No. 61-053382. (Mar. 1986).
Odian et al., "Schaum's Outline of Theory and Problems of General, Organic, and Biological Chemistry," Schaum's Outline Series, McGraw-Hill, Washington, D.C., p. 124-127, 1994.
Lide, D.R. (editor-in-chief), "CRC Handbook of Chemistry and Physics: A Ready-Reference Book of Chemical and Physical Data," 84th ed., CRC Press LLC, Boca Raton, Fla., 2003, p. 4-49.

* cited by examiner

*Primary Examiner* — Anthony J Green
(74) *Attorney, Agent, or Firm* — King & Schickli, PLLC

(57) ABSTRACT

A composition for deicing or inhibiting formation of ice includes waste material from a fermentation process for producing an amino acid from a carbohydrate source, and at least some second anti-freezing and deicing agent or a carrier. The active agent is waste material from a fermentation process for producing an amino acid from a carbohydrate source. The carrier may be water. A method for deicing an icy surface includes applying to that surface an effective amount of waste material from a fermentation process for producing an amino acid from a carbohydrate source.

13 Claims, No Drawings

ANTI-FREEZING/DEICING AGENT AND RELATED METHODS

This application claims the benefit of U.S. provisional patent application Ser. No. 61/091,593 filed on 25 Aug. 2008, the full disclosure of which is incorporated herein by reference.

BACKGROUND OF THE INVENTION

It is well known in the art to use microbes, such as certain bacteria, to convert carbohydrates, including starches and sugars, to amino acids by means of the process of fermentation. The two amino acids, lysine and glutamic acid, had a total commercial market value estimated to be in the range of $3.5 billion in 2004. Salts of these amino acids, such as monosodium glutamate (MSG), are in great demand having use as food additives. Thus, it should be appreciated that production of amino acids is a very large commercial business.

In the typical production sequence, bacteria are grown aerobically in a liquid nutrient medium containing carbohydrates, such as sugar, molasses or starch as a fermentation substrate. The bacteria are capable of excreting the desired amino acid synthesized outside their cell membrane into the surrounding liquid nutrient medium. The amino acid accumulates in this medium and is later separated from the fermentation broth and collected by means of filtration, neutralization and purification. Currently, the significant remaining byproduct or waste material from the fermentation process is usually sold inexpensively as animal feed or as an animal feed supplement.

In the past, a number of compounds have been used as anti-freezing or deicing agents for removing snow and ice from surfaces, such as highways and roads. Moreover, different methods have been disclosed in the art for developing compounds and compositions for use as anti-freezing or deicing agents. Chloride salts, such as calcium, magnesium or sodium chloride are the primary compounds that have been used as anti-freezing or deicing agents. Nonetheless, chloride salts have significant limitations as anti-freezing and/or deicing agents and detrimental effects resulting from the use of chloride salts as anti-freezing or deicing agents are well-known.

One of the primary limitations of using chloride salts for their anti-freezing and deicing capabilities is the limited range of temperatures that the chloride salts are effective. Specifically, chloride salts are generally effective as anti-freezing or deicing agents between approximately twenty degrees and thirty-two degrees Fahrenheit (20°-32° F.). Moreover, the use of chloride salts are harmful to the environment. Specifically, the high concentration of chloride salts can damage the soil, water, and/or vegetation in the areas where the chloride salts are used as anti-freezing and/or deicing agents. In addition, the corrosive nature of the chloride salts can damage the vehicles and roadways that come into contact with the chloride salts.

An early proposal for overcoming these problems was made by Dr. Jeno Toth of Hungary. Legend has it that Dr. Toth observed that even at temperatures well below freezing, snow and ice did not form on outdoor surfaces near where commercial plants discharged waste products resulting from alcohol distillation processes. Thus, after experimentation, he proposed the use of these distillation byproducts as alternatives to chloride salts as anti-freezing and deicing agents. A description of his experimentation with these compounds is found in U.S. Pat. No. 4,676,918, issued Jun. 30, 1987.

Later proposals seeking to diversify from Dr. Toth's work propose the use of similar types of byproducts as anti-freezing or deicing agents. For example, U.S. Pat. Nos. 5,709,813, 5,709,812, and 5,635,101, all to Janke et al., propose the use of the waste byproducts of the wet corn milling, wine, and cheese-making processes as anti-freezing and deicing agents. While the compositions forming these byproducts serve as effective anti-freezing and deicing agents, several limitations remain.

First, many of the compositions proposed in these patents take on the consistency of "thick molasses" at low temperatures and at extremely low temperatures (e.g., below 0° F.), become thick and putty-like. In this form, the compounds can only be effectively spread onto surfaces for use if first placed in solution with water or other compounds, such as known prior art chemical deicing agents. While it is feasible to do so to form an improved anti-freezing/deicing solution, it has been observed that such a solution continues to be high in the concentration of suspended solids and, thus, tends to clog conventional spraying or spreading devices. Such clogging can result in poor or inadequate spreading over the surface/object to be treated and thus ineffective performance. Still further, significant downtime may be necessary to clean the sprayers used to apply the composition. This costly and labor intensive operation is often quite difficult to perform when out on the job away from repair facilities and appropriate equipment for such a purpose. Such can be particularly detrimental when inclement weather, such as snow storms or severe temperature drops accompanied by precipitation, are quickly approaching or ongoing.

Thus, a need is identified for an improved anti-freezing and deicing composition that overcomes the above-described limitations of the prior art. The composition would preferably be readily available at a low cost, such as is the case with byproducts/waste materials of widely used commercial processes, and would be ready for use in conventional devices such as sprayers without any additional mixing or processing. The composition would be non-corrosive and preferably would also inhibit corrosion when mixed with prior art chemical anti-freezing or deicing agents. The composition would not have an offensive odor. The composition would also be environmentally friendly and, thus, could be applied without harming plants or contaminating the ground or surface water.

SUMMARY OF THE INVENTION

In accordance with the purposes of the present invention as described herein, a composition is provided for deicing or inhibiting the formation of ice. That composition comprises: (a) between about 1.0 and about 99.0% by weight waste material from a fermentation process for producing an amino acid from a carbohydrate source; (b) between about 0.0 and about 99% by weight of a second anti-freezing and deicing agent; and (c) between about 0.0 and about 60% by weight of a carrier wherein the composition includes at least some second anti-freezing and deicing agent or at least some carrier. In one particularly useful embodiment of the invention the amino acid is selected from a group consisting of glutamic acid and lysine. Still further, the carbohydrate source is selected from a group consisting of cassava, raw sugar, starch, starch hydrolysate, molasses, desugared molasses, corn sugar molasses, sugar beet molasses, sugar cane molasses, desugared sugar beet molasses and mixtures thereof.

In accordance with yet another aspect of the present invention, a method for deicing an icy surface comprises applying to the icy surface the above described composition in an amount effective to reduce the amount of ice on that surface.

Still further the present invention comprises a method for inhibiting the formation of ice on a surface, comprising applying to that surface an effective amount of a waste material produced during a process using fermentation to make glutamic acid or lysine.

In the following description there is shown and described certain embodiments of the invention, simply by way of illustration of some of the modes best suited to carry out the invention. As it will be realized, the invention is capable of other different embodiments, and its several details are capable of modification in various, obvious aspects all without departing from the invention. Accordingly, the descriptions will be regarded as illustrative in nature and not as restrictive.

DETAILED DESCRIPTION OF THE INVENTION

In accordance with the invention, a composition for deicing or inhibiting the formation of ice comprises (a) between about 1.0 and about 99% by weight waste material from a fermentation process for producing an amino acid from a carbohydrate source used as an anti-freezing and deicing agent; (b) between about 0.0 and about 99% by weight of a second anti-freezing and deicing agent; and (c) between about 0.0 and about 60% by weight of a carrier. The fermentation process relies upon the use of microbes that synthesize the desired amino acid from the carbohydrate source. The microbes may be genetically altered to better perform this function and include bacteria from various genera.

In one particularly useful embodiment of the present invention, the amino acid is selected from a group consisting of glutamic acid and lysine. Glutamic acid may be produced by bacteria from the genera *Bacillus, Micrococcus, Brevibacterium Microbacterium, Corynebacterium Anthrobacter* and the like. *Corynebacterium glutamicum* and related strains are useful in producing lysine. It should be appreciated, however, that other microorganisms useful in producing glutamic acid of lysine by means of fermentation of a carbohydrate source may be used.

The carbohydrate source may be any such source known to be useful in the production of the desired amino acid by means of microbial fermentation. Carbohydrate sources include, but are not limited to, cassava, raw sugar, starch, starch hydrolysate, molasses, desugared molasses, corn sugar molasses, sugar beet molasses, sugar cane molasses, desugared sugar beet molasses and mixtures thereof.

In one possible production process known in the art, a starch from cassava is hydrolized. After the starch processing stage, molasses is added during a syrup refining stage. After this stage, glucose syrup is added and the mixture proceeds to a fermentation stage.

During the fermentation stage, ammonia and micro-organisms, in this case bacteria, are added for microbial fermentation. The bacteria are grown in a liquid medium containing molasses as the fermentation substrate. Glutamic acid producing bacteria produce and excrete glutamic acid into the medium. Alternatively, lysine producing bacteria may be used to produce and excrete lysine into the medium. As a consequence of fermentation, all or substantially all of the sugar in the substrate is used.

Subsequently, the glutamic acid/lysine is separated from the medium by evaporation and neutralization (addition of sodium hydroxide and hydrochloric acid). The glutamic acid/lysine then goes through another stage of neutralization, followed by filtration and crystallization. The glutamic acid/lysine is then dried, sieved and packaged. The leftover byproduct or waste material from the fermentation process, sometimes referred to as condensed molasses fermentation solubles (CMS), is an active ingredient in the deicing composition of the present invention.

The waste material of the fermentation process exhibits enhanced deicing properties and is non-corrosive. The waste material is approximately sixty percent (60%) solids, but may vary depending on the process. The carrier is typically water although any other appropriate carrier suitable for use in a deicing composition including fermentation waste material may be used. The resulting composition is easily sprayed or applied to surfaces in need of deicing or where there is a desire to prevent freezing (such as roads, bridges, sidewalks, vehicles, machines, crops, aggregate piles, or the like).

The second anti-freezing and deicing agent may, for example, be selected from a group of material consisting of sugar cane molasses, sugar beet molasses, desugared sugar beet molasses, or organic agricultural byproducts. Alternatively, the second anti-freezing and deicing agent may be selected from a group consisting of calcium chloride, magnesium chloride, sodium chloride, potassium chloride, sodium formate, sodium acetate, potassium acetate, ethylene glycol, diethylene glycol. The second anti-freezing and deicing agent may be in solid form (granular) or solution brine) form. The first deicing agent serves to enhance the deicing properties and reduce the corrosive nature of these second anti-freezing and deicing agents. The weight percentages of the various ingredients of the composition are selected and mixed as desired in order to tailor the deicing properties of the composition to any particular application.

In accordance with yet another aspect of the present invention, it should be appreciated that the fermentation waste material deicing agent, can be used without further additions (100% or neat), which is desirable in terms of providing a completely natural deicing product. Alternatively, the fermentation waste material may be mixed with additional materials including, for example, water, anti-skid agents such as sand, cinders, etc. forming a composition in the range of 1-80% solids by weight, depending on the application.

The following detailed examples illustrate experiments which demonstrate the improved properties and characteristics of the compositions of the present invention. Of course, these examples are provided for purposes of illustration only and are not intended to be limiting.

Example 1

The objective of the first experiment was to determine the corrosiveness of various fermentation waste materials on metals. Initially, used steel nails were cleaned with an aqueous solution of muriatic acid (better known as hydrochloric acid, HCl). Subsequently, the steel nails were inserted into different solutions of fermentation waste materials (FWM) for thirty days to study the corrosive effects the solution had upon the steel nails. The results of the experiment of displayed in the table below:

|        | 10% FWM Solution | 20% FWM Solution | 30% FWM Solution |
|--------|------------------|------------------|------------------|
| Day 1  | No corrosion     | No corrosion     | No corrosion     |
| Day 2  | No corrosion     | No corrosion     | No corrosion     |
| Day 3  | No corrosion     | No corrosion     | No corrosion     |
| Day 5  | No corrosion     | No corrosion     | No corrosion     |
| Day 10 | No corrosion     | No corrosion     | No corrosion     |

-continued

|  | 10% FWM Solution | 20% FWM Solution | 30% FWM Solution |
|---|---|---|---|
| Day 20 | No corrosion | No corrosion | No corrosion |
| Day 30 | No corrosion | No corrosion | No corrosion |

As shown in the table, the 10%, 20% and 30% FWM solutions by weight did not show any corrosive effect on the steel nails in thirty days.

Example 2

The objective of the second experiment was to determine whether various FMW solutions would freeze under freezing conditions. FMW solutions ranging between 10% and 50% solids by weight were placed into freezing conditions. In particular, these solutions were placed into a freezer at 32° F. (0° C.) to study whether the solutions would freeze.

The 10% and 20% solids by weight FMW solutions froze the first day. The 30% solids by weight FMW solution by weight became "slushy" on the first day. Specifically, some freezing was observed, but the solution remained primarily in its liquid state. The 40% and 50% solids by weight FMW solutions did not freeze over the thirty day period. Based upon the experimentation, no increase in freeze point of the various FMW solutions was observed. Further, no dilution of the FMW solutions was observed throughout the testing.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention.

What is claimed:

1. A method for deicing an icy surface, comprising applying to said icy surface a deicing composition in an amount effective to reduce a level of ice on said surface wherein said deicing composition includes:
   between about 1.0 and about 99% by weight of a first anti-freezing and deicing agent comprising a waste material from a fermentation process for producing an amino acid from a carbohydrate source;
   between about 0.0 and about 99% by weight of a second anti-freezing and deicing agent; and
   between about 0.0 and about 60% by weight of a carrier wherein said composition includes at least some second anti-freezing and deicing agent or at least some carrier.

2. A method for deicing an icy surface, comprising applying to said icy surface a deicing composition in an amount effective to reduce a level of ice on said surface wherein said deicing composition includes:
   between about 1.0 and about 99% by weight of a first anti-freezing and deicing agent comprising a waste material from a fermentation process for producing a glutamic acid or lysine from a carbohydrate source;
   between about 0.0 and about 99% by weight of a second anti-freezing and deicing agent; and
   between about 0.0 and about 60% by weight of a carrier wherein said composition includes at least some second anti-freezing and deicing agent or at least some carrier.

3. A method for deicing an icy surface, comprising applying to said icy surface a deicing composition in an amount effective to reduce a level of ice on said surface wherein said deicing composition includes:
   between about 1.0 and about 99% by weight of a first anti-freezing and deicing agent comprising a waste material from a fermentation process for producing an amino acid from a carbohydrate source selected from a group consisting of cassava, raw sugar, starch, starch hydrolysate, molasses, desugared molasses, corn sugar molasses, sugar beet molasses, sugar cane molasses, desugared sugar beet molasses and mixtures thereof;
   between about 0.0 and about 99% by weight of a second anti-freezing and deicing agent; and
   between about 0.0 and about 60% by weight of a carrier wherein said composition includes at least some second anti-freezing and deicing agent or at least some carrier.

4. A method for deicing an icy surface, comprising applying to said icy surface a deicing composition in an amount effective to reduce a level of ice on said surface wherein said deicing composition includes:
   between about 1.0 and about 99% by weight of a first anti-freezing and deicing agent comprising a waste material from a fermentation process for producing an amino acid from a carbohydrate source wherein said waste material has from 1-80% solids by weight;
   between about 0.0 and about 99% by weight of a second anti-freezing and deicing agent; and
   between about 0.0 and about 60% by weight of a carrier wherein said composition includes at least some second anti-freezing and deicing agent or at least some carrier.

5. A method for deicing an icy surface, comprising applying to said icy surface a deicing composition in an amount effective to reduce a level of ice on said surface wherein said deicing composition includes:
   between about 1.0 and about 99% by weight of a first anti-freezing and deicing agent comprising a waste material from a fermentation process for producing an amino acid from a carbohydrate source;
   between about 0.0 and about 99% by weight of a second anti-freezing and deicing agent; and
   between about 0.0 and about 60% by weight of a carrier wherein said composition includes at least some second anti-freezing and deicing agent or at least some carrier and wherein said second anti-freezing and deicing agent is selected from a group of materials consisting of sugar cane molasses, sugar beet molasses, desugared sugar beet molasses, organic agricultural by products and mixtures thereof.

6. A method for deicing an icy surface, comprising applying to said icy surface a deicing composition in an amount effective to reduce the level of ice on said surface wherein said deicing composition includes between about 1.0 and about 99% by weight of a first anti-freezing and deicing agent comprising a waste material from a fermentation process for producing an amino acid from a carbohydrate source;
   between about 0.0 and about 99% by weight of a second anti-freezing and deicing agent; and
   between about 0.0 and about 60% by weight of a carrier wherein said composition includes at least some second anti-freezing and deicing agent or at least some carrier and wherein said second anti-freezing and deicing agent is selected from a group consisting of calcium chloride, magnesium chloride, sodium chloride, potassium chloride, sodium formate, sodium acetate, potassium acetate, ethylene glycol, diethylene glycol and mixtures thereof.

7. A method for deicing an icy surface, comprising applying to said icy surface a deicing composition in an amount effective to reduce a level of ice on said surface wherein said deicing composition includes between about 1.0 and about 99% by weight of a first anti-freezing and deicing agent comprising a waste material from a fermentation process for producing an amino acid from a carbohydrate source;
   between about 0.0 and about 99% by weight of a second anti-freezing and deicing agent; and
   between about 0.0 and about 60% by weight of a carrier wherein said composition includes at least some second anti-freezing and deicing agent or at least some carrier and said carrier is water.

8. A method for inhibiting the formation of ice on a surface, comprising applying to said surface a deicing composition wherein said deicing composition includes:
   between about 1.0 and about 99% by weight of a first anti-freezing and deicing agent comprising a waste material from a fermentation process for producing an amino acid from a carbohydrate source;
   between about 0.0 and about 99% by weight of a second anti-freezing and deicing agent; and
   between about 0.0 and about 60% by weight of a carrier wherein said composition includes at least some second anti-freezing and deicing agent or at least some carrier.

9. A method for inhibiting the formation of ice on a surface, comprising applying to said surface a deicing composition wherein said deicing composition includes:
   between about 1.0 and about 99% by weight of a first anti-freezing and deicing agent comprising a waste material from a fermentation process for producing a glutamic acid or lysine from a carbohydrate source;
   between about 0.0 and about 99% by weight of a second anti-freezing and deicing agent; and
   between about 0.0 and about 60% by weight of a carrier wherein said composition includes at least some second anti-freezing and deicing agent or at least some carrier.

10. A method for inhibiting the formation of ice on a surface, comprising applying to said surface a deicing composition wherein said deicing composition includes:
   between about 1.0 and about 99% by weight of a first anti-freezing and deicing agent comprising a waste material from a fermentation process for producing an amino acid from a carbohydrate source selected from a group consisting of cassaya, raw sugar, starch, starch hydrolysate, molasses, desugared molasses, corn sugar molasses, sugar beet molasses, sugar cane molasses, desugared sugar beet molasses and mixtures thereof;
   between about 0.0 and about 99% by weight of a second anti-freezing and deicing agent; and
   between about 0.0 and about 60% by weight of a carrier wherein said composition includes at least some second anti-freezing and deicing agent or at least some carrier.

11. A method for inhibiting the accumulation of snow and ice on a surface comprising applying to said surface a waste material produced during a process using fermentation to make glutamic acid or lysine in an amount effective to inhibit accumulation of snow and ice on said surface.

12. The method of claim 11 including, applying an anti-skid agent to said surface with said waste material.

13. The method of claim 11 including, applying sand to said surface with said waste material.

* * * * *